(12) United States Patent
Manji

(10) Patent No.: US 11,247,723 B2
(45) Date of Patent: Feb. 15, 2022

(54) TRAVELING VEHICLE

(71) Applicant: Kubota Corporation, Osaka (JP)

(72) Inventor: Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 106 days.

(21) Appl. No.: 15/930,575

(22) Filed: May 13, 2020

(65) Prior Publication Data

US 2021/0129904 A1 May 6, 2021

(30) Foreign Application Priority Data

Oct. 30, 2019 (JP) .............................. JP2019-197139

(51) Int. Cl.
*B62D 11/00* (2006.01)
*B62D 11/04* (2006.01)

(52) U.S. Cl.
CPC ............ *B62D 11/003* (2013.01); *B62D 11/04* (2013.01)

(58) Field of Classification Search
CPC .............................. B62D 11/003; B62D 11/04
See application file for complete search history.

(56) References Cited

U.S. PATENT DOCUMENTS

| 8,490,722 | B2 | 7/2013 | Koga et al. |
| 10,967,903 | B2* | 4/2021 | Uemura ............... B60K 7/0007 |
| 2020/0014320 | A1* | 1/2020 | Ito ...................... H02P 23/0004 |

* cited by examiner

*Primary Examiner* — Kevin Hurley
(74) *Attorney, Agent, or Firm* — The Webb Law Firm

(57) ABSTRACT

A traveling vehicle includes a left drive wheel and a right drive wheel which are driven independently by a left driving section and a right driving section, a manual operation unit configured to provide a left speed instruction for adjusting a rotational speed of the left drive wheel and a right speed instruction for adjusting a rotational speed of the right drive wheel and a drive control unit configured to control driving of the left driving section and the right driving section based on the left speed instruction and the right speed instruction, with using a first control method and a second control method which are provided with different control properties from each other. The drive control unit includes a single mode employing either one of the first control method and the second control method and a composite mode employing the first control mode and the second control mode in time-differentiated combination. In the composite mode, based on a difference between the left speed instruction and the right speed instruction, a combination ratio between the first control method and the second control method is determined.

6 Claims, 5 Drawing Sheets

TRAVELING VEHICLE

CROSS-REFERENCE TO RELATED APPLICATION

This application claims priority to Japanese Patent Application No. 2019-197139 filed Oct. 30, 2019, the disclosure of which is hereby incorporated by reference in its entirety.

BACKGROUND OF THE INVENTION

Technical Field

Conventionally, as a grass mowing machine or an agricultural work (utility) machine, there has been used a traveling work vehicle having a pair of left and right drive wheels driven respectively by a pair of left and right motors. In such traveling vehicle, there is employed the PI (Proportional-Integral) control method or the PID (Proportional-Integral-Differential) control method as a control method for controlling electric currents flowing in the motors. A traveling vehicle disclosed in U.S. Pat. No. 8,490,722 includes left and right wheels driven independently by left and right motors, an instruction value calculating means for calculating target rotational speed instruction values for the left and right motors based on an acceleration instruction and a turning instruction inputted by a driver, a target yaw rate calculating means for calculating a target yaw rate based on the acceleration instruction and the turning instruction, a yaw rate detecting means for detecting a yaw rate of the vehicle, and a controlling means for correcting a target rotational speed instruction value based on a difference between the yaw rate detection value and the target yaw rate.

With such traveling vehicle disclosed in U.S. Pat. No. 8,490,722, the direction of the vehicle is changed if a difference is developed between a rotational speed of the left drive wheel and a rotational speed of the right drive wheel. The greater the rotational speed difference, the smaller the turning radius the vehicle can turn. In particular, by rotating one drive wheel in the forward traveling direction and rotating the other drive wheel in the reverse traveling direction, a turning about the vehicle body center, a so-called "zero-turn", is also possible. However, since a traveling vehicle effects such forward traveling and turning operation with high frequency, the controlling properties employed in such control method as the PI control or PID control are generally set to obtain stability in a mode of traveling having higher priority. For example, the method often selectively employs such control properties that allow a certain degree of co-rotation of the drive wheel on the inner side of the turning so as not to roughen the ground surface at the time of mode of turning with a small turning radius including the zero-turn mode. However, with this setting, there occurs such a trouble of slipping down of the vehicle body due to the co-rotation at time of vehicle making a stop on a sloped surface. In view of this, the object of the present invention is to provide a traveling vehicle including left and right drive wheels driven independently by a left driving section and a right driving section that can obtain favorable stability in various modes of traveling.

SUMMARY OF THE INVENTION

According to the present invention, there is provided a traveling vehicle comprising:
a left drive wheel and a right drive wheel which are driven independently by a left driving section and a right driving section;
a manual operation unit configured to provide a left speed instruction for adjusting a rotational speed of the left drive wheel and a right speed instruction for adjusting a rotational speed of the right drive wheel; and
a drive control unit configured to control driving of the left driving section and the right driving section based on the left speed instruction and the right speed instruction, with using a first control method and a second control method which are provided with different control properties from each other;
wherein the drive control unit includes a single mode employing either one of the first control method and the second control method and a composite mode employing the first control mode and the second control mode in time-differentiated combination; and
wherein in the composite mode, based on a difference between the left speed instruction and the right speed instruction, a combination ratio between the first control method and the second control method is determined.

With the above-described arrangement, as control methods for rotational speed control of the left drive wheel and the right drive wheel, there are provided a first control method and a second control method having different control properties and also there are provided a single mode employing either one of the first control method and the second control method and a composite mode employing the first control mode and the second control mode in time-differentiated combination. In the composite mode, based on a difference between the left speed instruction and the right speed instruction, a combination ratio between the first control method and the second control method is determined. Therefore, traveling stability at time of direction change of the vehicle body relying on a rotational speed difference between the drive wheels is ensured. Moreover, when the manual operation unit is set to a neutral state, the arrangement allows a mode of control for preventing slip-down of the vehicle body on a sloped surface by speedily setting the driving of the driving sections to zero.

According to a preferred embodiment of the invention, the first control method is PI control or PID control, and the second control method is P control.

As control methods of the drive control unit, the PID control, the PI control and the P control are well-known. As the PID control and the PI control have such properties that allow smooth approach to a target value set by the manual operation unit, maneuvering without giving strange or uncomfortable feel is possible. However, the I component control action provided by the PID control or the PI control has a property of its effect being provided only after lapse of certain time. Thus, this cannot be said to be appropriate for stopping the vehicle body with emergency by a neutral setting operation. On the other hand, in the case of the P control, the speed control is effected with using speed values proportional to speed instructions given by the manual operation unit. Thus, irrespectively of the current traveling state, an operation input given by the driver will be directly reflected in the wheel rotational speeds. For this reason, although the P control is unsuitable for high speed traveling or traveling involving high-precision utility work, the P control is effected under a certain traveling state such as a super-low speed traveling on a sloped surface. Further, in a special traveling state which is regulated by the difference between the left speed instruction and the right speed instruction, either one of the PID control and the PI control can be used in combination with the P control, advantageously.

According to a preferred embodiment of the present invention in case the first control method is either the PI control or the PID control and the second control method is the P control, wherein:

if the left speed instruction is greater than the right speed instruction, a ratio of the P control in the drive control of the right driving section is set greater than the ratio of the P control in the drive control of the left driving section; and if the right speed instruction is greater than the left speed instruction, the ratio of the P control in the drive control of the left driving section is set greater than the ratio of the P control in the drive control of the right driving section.

When the PID control or the PI control is compared with the P control, the PID control or the PI control provides more smooth and stable traveling. Whereas, the P control is suitable for a certain limited traveling state such as vehicle body turning based on a rotational speed difference between the left and right drive wheels.

The P control is suitable in case of a low rotational speed. For this reason, according to a preferred embodiment of the present invention in case the first control method is either the PI control or the PID control and the second control method is the P control, wherein:

the left speed instruction and the right speed instruction are compared with each other, and the single mode using the PI control alone is employed for the drive control based on the greater speed instruction, whereas the composite speed control is employed for the drive control based on the smaller speed instruction.

According to one preferred embodiment of the traveling vehicle of the present invention:

the left speed instruction and the right speed instruction respectively include a forward speed instruction and a reverse speed instruction; and if the forward speed instruction and the reverse speed instruction are provided to the left driving section and the right driving section, the composite mode is employed for the drive control based on the reverse speed instruction.

When the vehicle body is caused to make a turning based on a rotational speed difference between the left and right drive wheels, the lower the rotational speed of the drive wheel on the inner side of the turn, the smaller the turning radius becomes. And, if the drive wheel on the inner side of the turning is rotated in the opposite direction to the direction of the drive wheel on the outer side of the turning, a turning about the vehicle body center is possible.

According to a still further preferred embodiment of the present invention:

in the composite mode, the combination ratio is determined based on a duty ratio within a predetermined control cycle, and the duty ratio is fixed or variable.

In case the first control method and the second control method are combined by a predetermined ratio, advantageously, the rotational speed control by the first control method and the rotational speed control by the second control method are effected alternately.

DETAILED DESCRIPTION OF PREFERRED EMBODIMENTS

Figure 1:
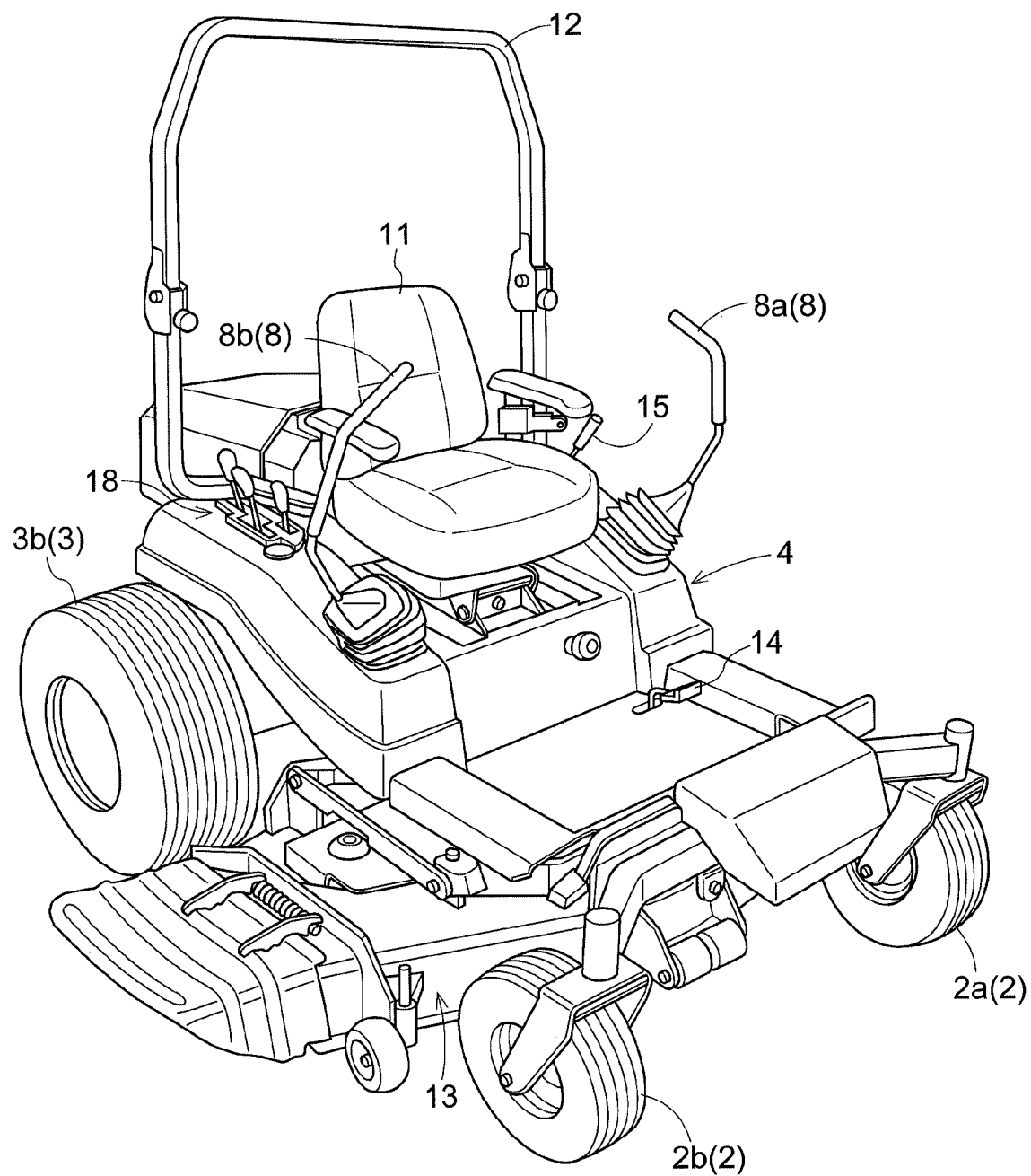
FIG. 1 is a perspective view of a traveling vehicle.
Figure 2:
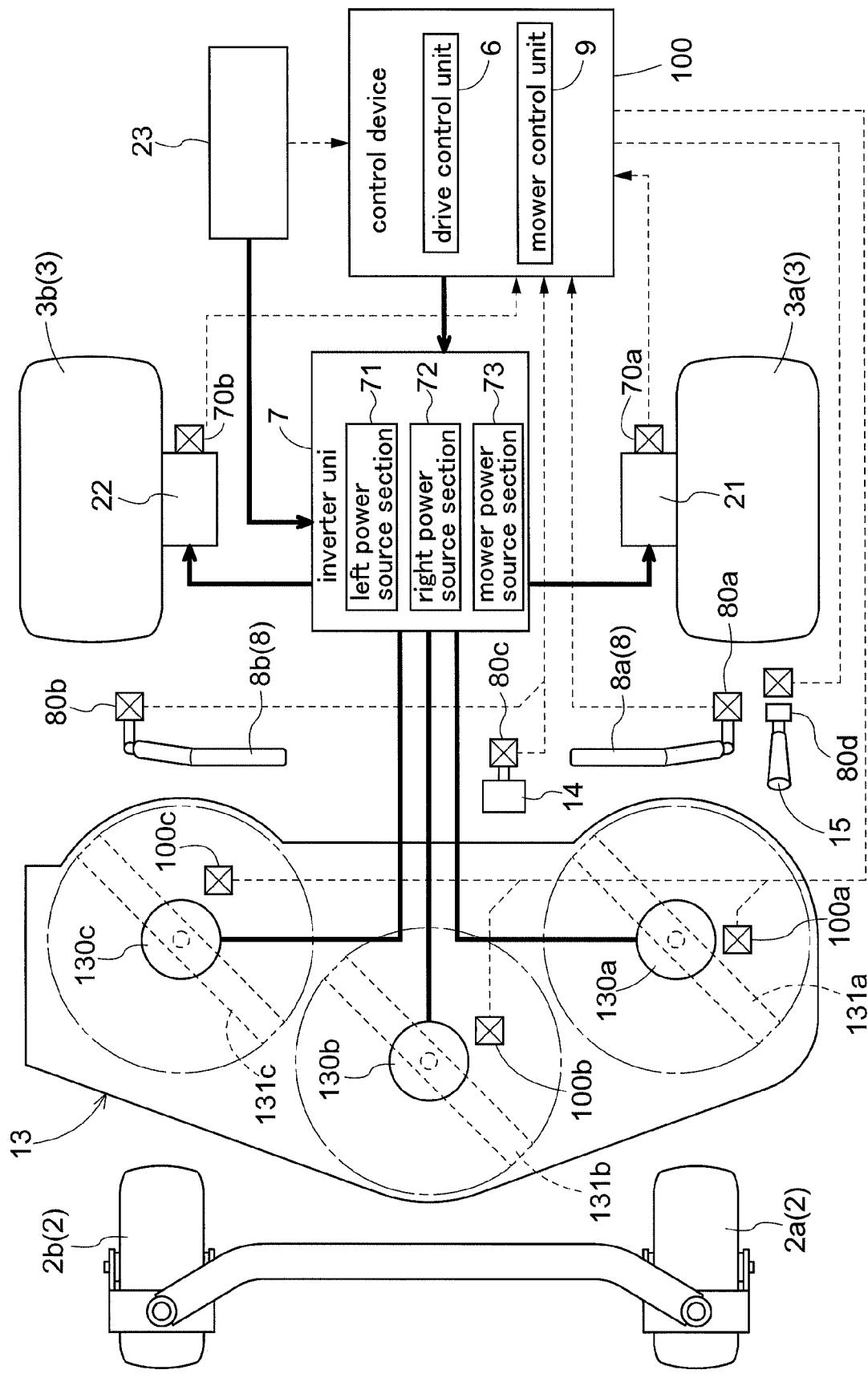
FIG. 2 is a system diagram showing an electric system and a power system of the traveling vehicle.

A riding electric grass mowing machine (to be referred to simply as "grass mowing machine" hereinafter) disclosed in the instant embodiment is one example of a "traveling vehicle". Incidentally, the traveling vehicle is not limited to a grass mowing machine. FIG. 1 shows a perspective view of this grass mowing machine. FIG. 2 shows an electric system diagram and a power system diagram of the grass mowing machine. Incidentally, in this detailed disclosure, unless explicitly indicated otherwise, the term "front" means the front or forward side in the vehicle body front/rear direction (traveling direction) and the term "rear" means the rear side in the vehicle body front/rear direction (traveling direction). Further, the left/right direction or the lateral direction refers to the vehicle body transverse direction (vehicle body width direction) orthogonal to the vehicle body front/rear direction. Further, the term "upper" and the term "lower" refer to the positional relationship with respective to the perpendicular (vertical) direction of the vehicle body, referring to the ground height or clearance.

As shown in FIG. 1 and FIG. 2, the grass mowing machine includes a vehicle body 4 and this vehicle body 4 is supported by front wheels 2 and rear wheels 3. The front wheels 2 are caster wheels including a left front wheel 2a and a right front wheel 2b. The rear wheels 3 are drive wheels including a left rear wheel 3a and a right rear wheel 3b. The left rear wheel 3a is a "left drive wheel". The right rear wheel 3b is a "right drive wheel". At a rear portion of the vehicle body 4, a battery 23 is disposed. Forwardly of this battery 23, a driver's seat 11 is disposed. Rearwardly of the driver's seat 11, a ROPS frame 12 is disposed. In the space under the vehicle body 4 and between the front wheels 2 and the rear wheels 3, a mower unit 13 is suspended from the vehicle body 4 via a lift link mechanism to be liftable up/down.

Forwardly of the driver's seat 11, there is provided a floor plate serving as a "footrest" for the driver. On the top face of the floor plate, a brake pedal 14 is mounted. On the both sides of the driver's seat 11, there are disposed a left maneuvering lever 8a and a right maneuvering lever 8b. The left maneuvering lever 8a and the right maneuvering lever 8b together constitute one exemplary arrangement of a "manual operation unit 8". On the right side of the driver's seat 11, there is provided an electric operation panel 18 including switching buttons, switching levers, etc. for electric control. On the left side of the driver's seat 11, there is provided a mower operational tool 15. The driver effects ON/OFF operations of the mower unit 13 via this mower operational tool 15.

As shown in FIG. 2, a control device 100 includes a drive control unit 6 and a mower control unit 9. The left rear wheel 3a and the right rear wheel 3b as drive wheels are rotatably driven by a left motor 21 as a "left driving section" and a right motor 22 as a "right driving section". The left motor 21 and the right motor 22 are controllably driven independently of each other. Based on a left wheel control signal from the drive control unit 6, the left motor 21 receives electric power from a left electric power source section 71, whereby the left motor 21 is rotatably driven. Based on a right wheel control signal from the drive control unit 6, the right motor 22 receives electric power from a right electric power source section 72, whereby the right motor 22 is rotatably driven. The left electric power source section 71 and the right electric power source section 72 are constituted of inverters and incorporated together within an inverter unit 7.

The mower unit 13 includes three rotary blades 131a, 131b, 131c. And, these rotary blades 131a, 131b, 131c rely for their drive sources, on mower motors 130a, 130b, 130c, respectively. In operation, based on control signals from the mower control unit 9, the mower motors 130a, 130b, 130c receive power supply from a mower power source section 73, whereby the mower motors 130a, 130b, 130c are rotatably driven. The mower power source section 73 too is constituted of an inverter and incorporated within the inverter unit 7.

With this grass mowing machine, a direction change (turning) of the vehicle body 4 is effected based on a rotational speed difference between the left rear wheel 3a and the right rear wheel 3b. And, change speed operations of the left motor 21 and the right motor 22 are effected in response to pivotal operations of the left maneuvering lever 8a and the right maneuvering lever 8b. More particularly, in response to user operations on the left maneuvering lever 8a and the right maneuvering lever 8b, stop state, forward traveling state, gentle turning state, pivot turning state and spin turning state are realized respectively. For instance, the stop state is realized by stopping the left rear wheel 3a and the right rear wheel 3b. The straight traveling state is realized by forwardly driving the left rear wheel 3a and the right rear wheel 3b at an equal speed. The straight traveling state is also realized by reversely driving the left rear wheel 3a and the right rear wheel 3b at an equal speed. The gentle turning state is realized by forwardly driving the left rear wheel 3a and the right rear wheel 3b at different speeds. The gentle turning state is also realized by reversely driving the left rear wheel 3a and the right rear wheel 3b at different speeds. The pivot turning state is realized by stopping one of the left rear wheel 3a and the right rear wheel 3b and driving the other thereof forwardly or reversely. The spin turning state is realized by driving one of the left rear wheel 3a and the right rear wheel 3b forwardly and driving the other thereof reversely.

An operational amount (a pivot angle) of the left maneuvering lever 8a is detected by a left maneuvering angle detection sensor 80a. An operational amount (a pivot angle) of the right maneuvering lever 8b is detected by a right maneuvering angle detection sensor 80b. Further, an operational angle of the brake pedal 14 is detected by a brake detection sensor 80c. An operation of the mower operational tool 15 is detected by mower sensor 80d. Further, a rotational speed of the left rear wheel 3a, namely, a rotational speed of the left motor 21, is detected by a left rotation detection sensor 70a. A rotational speed of the right rear wheel 3b, namely, a rotational speed of the right motor 22, is detected by a right rotation detection sensor 70b. Moreover, rotational speeds of the mower motors 130a, 130b, 130c are detected by mower rotation sensors 100a, 100b, 100c, respectively. Detection results of the above respective sensors are transmitted to the control device 100 and appropriately used by the control device 100. The control device 100 is constituted of a CPU as its core component.

The control device 100 includes the drive control unit 6 and the mower control unit 9 which are constituted of one or both of hardware and software. The mower control unit 9 generates a control signal based on the detection signal from the mower sensor 80d and provides this control signal to the mower power source section 73, thus controlling driving of the mower motors 130a, 130b, 130c. Based on operation amounts of the left maneuvering lever 8a and the right maneuvering lever 8b, rear wheel control signals are generated. The drive control unit 6 provides rear wheel control signals to the left electric power source section 71 and the right electric power source section 72, thus controlling driving of the left motor 21 and the right motor 22.

Figure 3:
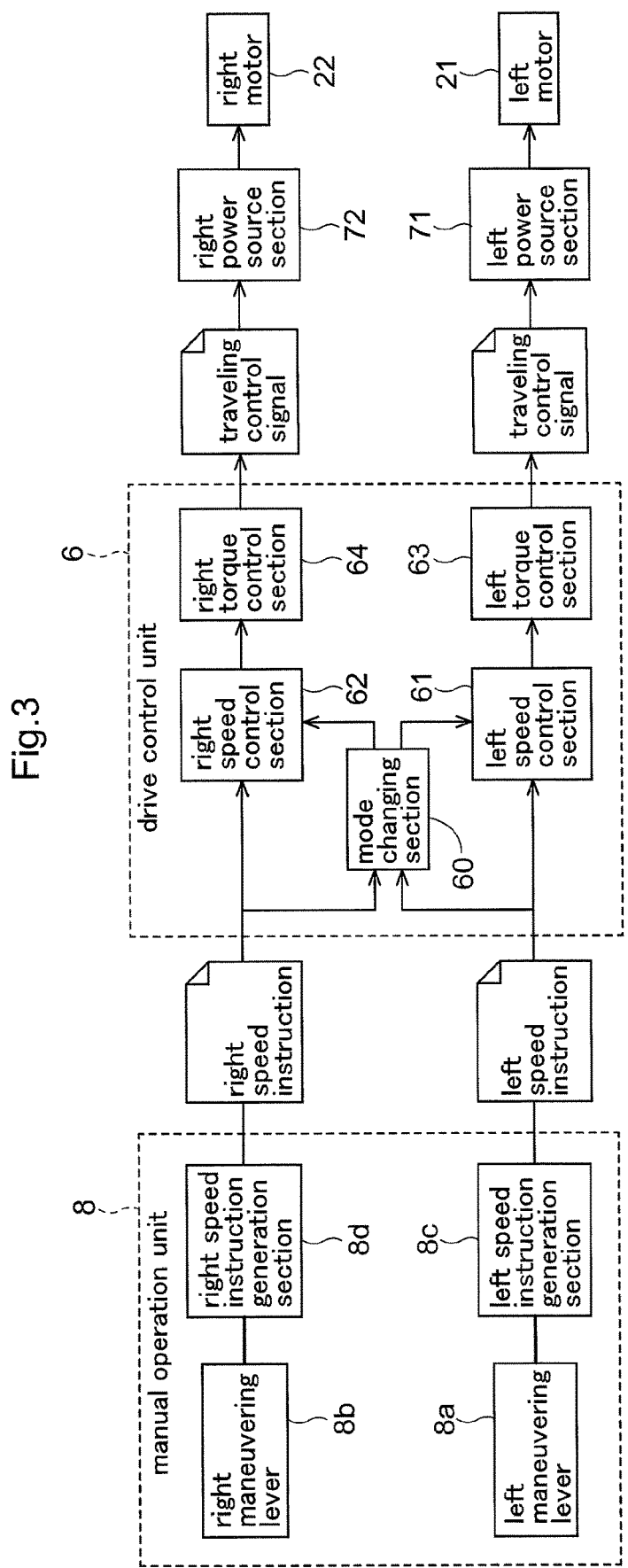
FIG. 3 is a functional block diagram for illustrating flow and functions of drive control of drive wheels.

As shown in FIG. 3, the manual operation unit 8 is constituted of the left maneuvering lever 8a, the right maneuvering lever 8b, a left speed instruction generation section 8c and a right speed instruction generation section 8d. The left speed instruction generation section 8c generates a left speed instruction based on a detection signal detected by the left maneuvering angle detection sensor 80a (see FIG. 2). The right speed instruction generation section 8d generates a right speed instruction based on a detection signal detected by the right maneuvering angle detection sensor 80b (see FIG. 2). These left and right speed instructions are given to the drive control unit 6.

The drive control unit 6 generates traveling control signals based on the left speed instruction and the right speed instruction with using PI control as a first control method and P control as a second control method which have different control properties from each other. And the drive control unit 6 controls driving of the left motor 21 and the right motor 22 accordingly.

As shown in FIG. 3, the drive control unit 6 includes a mode changing section 60, a left speed control section 61, a right speed control section 62, a left torque control section 63 and a right torque control section 64. The mode changing section 60 selects either a single mode using either one of the PI control and the P control and a composite mode using the PI control and the P control in time-differentiated combination, as control methods to be used in the left speed control section 61 and the right speed control section 62. Further, the mode changing section 60 determines a combination ratio between the PI control and the P control in the composite mode.

Here, the left speed control section 61 and the right speed control section 62 are constituted of the PI control. Therefore, the mode changing section 60 is configured to adjust a proportional gain and an integral gain in the PI control, thereby to change the ratios of operations by the PI control or the P control by the left speed control section 61 and the right speed control section 62. More particularly, the mode changing section 60 has a function of adjusting the periods of effecting the PI control and the P control respectively within a control cycle by the PWM control method.

Certain conditions considered by the mode changing section 60 in determining the combinational ratio between the PI control and the P control will be shown below.

(1) In case the left speed instruction and the right speed instruction have zero or substantially zero difference therebetween, for driving controls for the left motor 21 and the right motor 22, only the PI control is used. With this, when a difference develops between the left speed instruction and the right speed instruction, the P control is applied to at least the driving control for the motor on the inner side of turning.

(2) In case the left speed instruction is greater than the right speed instruction, the proportional gains and the integral gains of the left speed control section 61 and the right speed control section 62 will be adjusted such that the ratio of the P control for driving control of the right motor 22 may be rendered greater than that for driving control of the left motor 21. Conversely, in case the right speed instruction is greater than the left speed instruction, the proportional gains and the integral gains of the left speed control section 61 and the right speed control section 62 will be adjusted such that the ratio of the P control for driving control of the left motor 21 may be greater than that for driving control of the right motor 22.

(3) In the case of driving control based on whichever greater one of the right speed instruction and the left speed instruction compared with each other, the single mode using the PI control alone is employed. Whereas, for driving control of whichever smaller one, the composite control mode is employed. And, for the ratio between the PI control and the P control (the ratio between the PI control period and the P control period) in the composite mode, the greater the difference between the right speed instruction and the left speed instruction, the ratio of the P control may be set greater. Alternatively, the ratio between the PI control and the P control may be set as a fixed value which is set in advance.

(4) In this embodiment, a forward traveling speed and a reverse traveling speed can be set based on pivotal operations on the left maneuvering lever 8a and the right maneuvering lever 8b. Either one of the left maneuvering lever 8a and the right maneuvering lever 8b may set a forward traveling speed and the other one of the left maneuvering lever 8a and the right maneuvering lever 8b may set a reverse traveling speed. In this case, namely, in case a forward speed instruction and a reverse speed instruction are given to the left motor 21 and the right motor 22, the composite mode will be employed for driving control to be effected based on the reverse speed instruction.

As a condition for use in setting the ratio between the PI control and the P control by the mode changing section 60 in the above-described situations (1) through (4), a difference between the left speed instruction an the right speed instruction based on pivotal operations on the left maneuvering lever 8a and the right maneuvering lever 8b is used. However, this difference between the left speed instruction and the right speed instruction may be replaced by a difference between a rotational speed of the left rear wheel 3a (left motor 21) and a rotational speed of the right rear wheel 3b (right motor 22). Therefore, in this detailed disclosure, as the condition for setting the ratio between the PI control and the P control by the mode changing section 60, the difference between the left speed instruction and the right speed instruction can be considered equivalent to the rotational speed difference between the rear wheels (motor speed difference).

Figure 4:
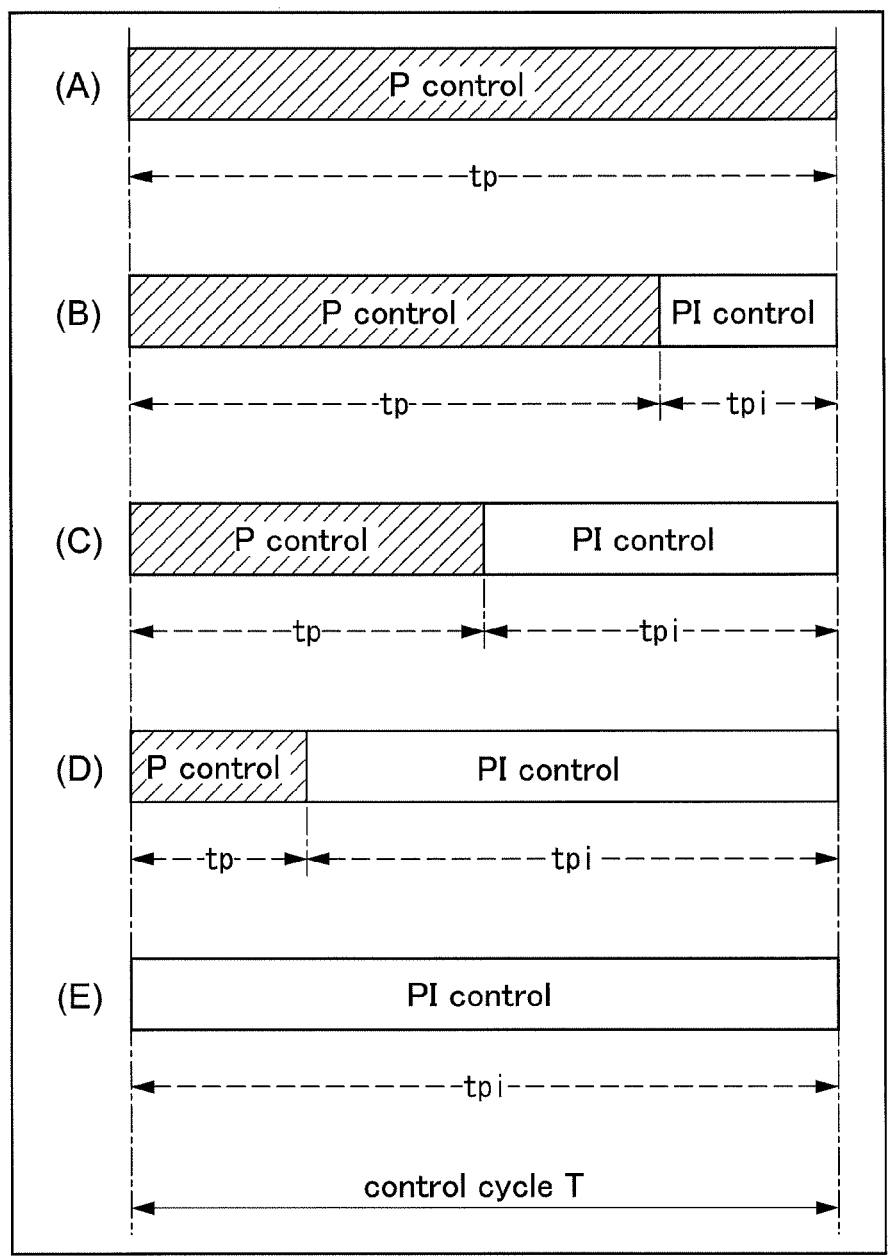
FIG. 4 is an explanatory view for explaining a P control period and PI control period which are set within the control period.

FIG. 4 shows a diagram for explaining the time-differentiated combination between the PI control and the P control determined by the mode changing section 60, namely, the ratio (duty ratio) between the P control and the PI control in a repetitive control cycle T. The mode changing section 60 determines a period (tp) of the P control and a period (tpi) of the PI control independently for the left speed control section 61 and the right speed control section 62 in the control cycle T.

In the case of an example (A) shown in FIG. 4, the P control period (tp) is set as 100% period in the control cycle T and the PI control period (tpi) is set as 0% in the control cycle T. In the case of an example (B) shown in FIG. 4, the P control period (tp) is set as 75% period in the control cycle T and the PI control period (tpi) is set as 25% in the control cycle T. In the case of an example (C) shown in FIG. 4, the P control period (tp) is set as 50% period in the control cycle T and the PI control period (tpi) is set as 50% in the control cycle T. In the case of an example (D) shown in FIG. 4, the P control period (tp) is set as 25% period in the control cycle T and the PI control period (tpi) is set as 75% in the control cycle T. In the case of an example (E) shown in FIG. 4, the P control period (tp) is set as 0% period in the control cycle T and the PI control period (tpi) is set as 100% in the control cycle T. Namely, the example (A) above represents the single mode using the P control alone. The examples (B) through (D) all represent the composition mode. And, the example (E) shown in FIG. 4 represents the single mode using the PI control alone. Needless to say, the time-differentiated combination between the P control and the PI control in the composite mode, namely, the P control period (tp) and the PI control period (tpi) in the control cycle T, can be set differently from above.

Figure 5:
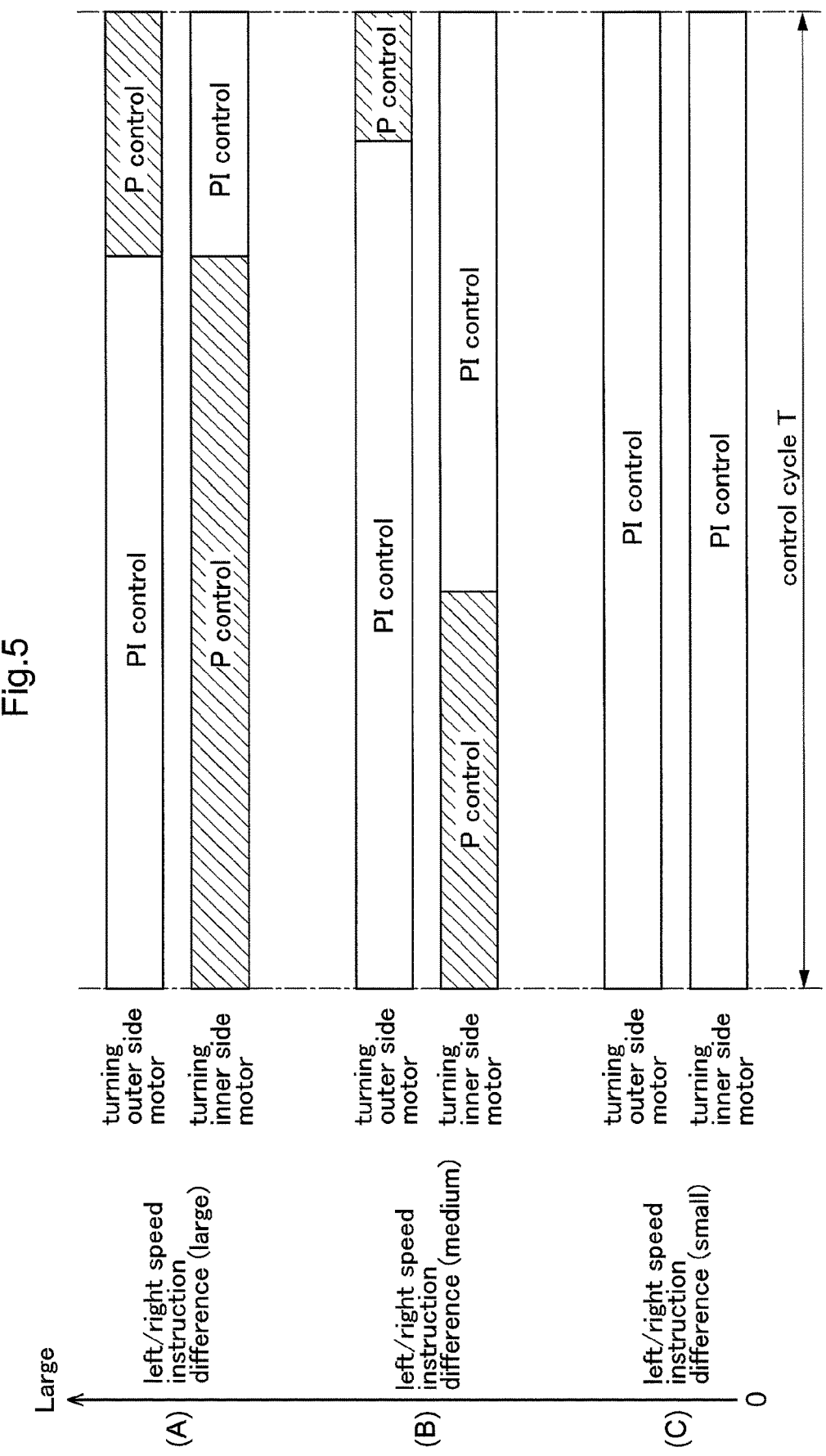
FIG. 5 is an explanatory view for explaining a ratio between the PI control and the P control based on a difference between a left speed instruction and a right speed instruction.

FIG. 5 shows an example of time-differentiated combination of the P control and the PI control determined for the left speed control section 61 and the right speed control section 62 by the mode changing section 60 in accordance with a traveling condition. Here, the mode changing section 60 determines the time-differentiated combination ratios between the P control and the PI control in accordance with a difference between the pivotal operational amounts of the left maneuvering lever 8a and the right maneuvering lever 8b, namely, on a difference between the left speed instruction and the right speed instruction. Advantageously, the relation between speed instruction differences and combinational ratios will be provided in the form of a map.

In FIG. 5, the differences between the left speed instruction and the right speed instructions are divided into three stages. An example (A) in FIG. 5 represents a condition of the difference between the left speed instruction and the right speed instruction being large. An example (B) in FIG. 5 represents a condition of the difference between the left speed instruction and the right speed instruction being intermediate. An example (C) represents a condition of the difference between the left speed instruction and the right speed instruction being small.

Under the condition (A) in FIG. 5, in the speed control section (left speed control section 61 or the right speed control section 62) corresponding to the motor (the left motor 21 or the right motor 22) which is located on the outer side of the turning of the vehicle body 4, the PI control period in the control cycle T is set to 80% and the P control period in the control cycle T is set to 20%. Whereas, in the speed control section corresponding to the motor located on the inner side of the turning, the P control period in the control cycle T is set to 80% and the PI control period in the control cycle T is set to 20%. Incidentally, in place of the above, the PI control period of the speed control section corresponding to the motor located on the outer side of the turning of the vehicle body 4 may be set to 100% and the P control period of the speed control section corresponding to the motor located on the inner side of the turning of the vehicle body 4 may be set to 100%.

Under the condition (B) in FIG. 5, in the speed control section corresponding to the motor located on the outer side of the turning of the vehicle body 4, the PI control period in the control cycle T is set to 90% and the P control period in the control cycle T is set to 10%. In the speed control section corresponding to the motor located on the inner side of the turning of the vehicle body 4, the PI control period in the control cycle T is set to 60% and the P control period in the control cycle T is set to 40%.

Under the condition (C) in FIG. 5, in the both speed control sections corresponding to the motors located on the outer side and the inner side of the turning of the vehicle body 4, there is set the PI control single mode in which the PI control period in the control cycle T is set to 100%.

For a traveling vehicle which effects a turning based on a speed difference between the left speed instruction and the right speed instruction, the P control will be incorporated in the PI control based on such speed difference. With this, it becomes possible to stop the vehicle body 4 on a sloped surface by reducing the speed difference between the left speed instruction and the right speed instruction while low-speed traveling of the vehicle and then to maintain the left maneuvering lever 8a and the right maneuvering lever 8b to the neutral state. Further, when the vehicle body 4 is caused to start traveling again from this condition, since control mode of zero speed is provided initially, slip-down of the vehicle body 4 can be suppressed effectively.

The drive control unit 6 effects, for the left motor 21 or the right motor 22, not only the speed control, but also a torque control by the left torque control section 63 and the right torque control section 64. The left torque control section 63 and the right torque control section 64 are configured such that when the actual rotational speed (actual speed) becomes smaller than a target value due to increase of the traveling load, the electric power is corrected to increase the motor output torque; whereas, when the actual rotational speed (actual speed) becomes greater than the target value due to traveling on a downslope, etc., the electric power is corrected to decrease the motor output torque.

Other Embodiments

In the foregoing embodiment, explanation was made with citing a grass mowing machine as an example of a "traveling vehicle". However, the traveling vehicle may be a tractor which carries out a cultivating work in a field, a rice planting machine, even a combine which carries out a harvesting work of grain culms in a field, a riding managing machine which carries out a chemical agent spraying work, or a direct rice seed sowing machine, etc. Namely, the "traveling vehicle" in the context of this disclosure is understood to be inclusive of a grass mowing machine, a tractor, a rice planting machine, a combine, a direct (rice) seed sowing machine, a riding managing machine. Needless to say, the present invention is applicable also to traveling vehicles configured to carry out other (utility) works in a field. Moreover, the present invention is applicable not only to a riding traveling vehicle, but also to a traveling machine or vehicle which can be remotely controlled.

In the foregoing embodiment, as the driving sections, variable speed electric motors were employed. Instead, it is also possible to employ a pair of left and right HST's which are of the hydraulic type and which allow stepless speed change operations. With such HST's, adjustment of swash plate angles as speed change operations are effected by control signals from the left speed control section 61 or the right speed control section 62.

In the foregoing embodiment, it was explained that the first control method is the PI control and the second control method is the P control. However, the PI control can be replaced by the PID control. Moreover, as the first control method and the second control method, the fuzzy control or the neuro control that allows adjustment of control gains may be employed.

The present invention is applicable to a traveling vehicle which allows independent driving of the pair of left and right drive wheels.

Incidentally, the arrangements disclosed in the foregoing embodiments (including the other embodiments) may be used in any combinations with the arrangements disclosed in any other embodiment unless contradiction results from such combinations. Further, it is noted that the embodiments disclosed in this detailed disclosure are only exemplary and embodiments of the present invention are not limited thereto, but may be modified in any appropriate matter within a range not deviating from the object of the present invention.

The invention claimed is:

1. A traveling vehicle comprising:
a left drive wheel and a right drive wheel which are driven independently by a left driving section and a right driving section;
a manual operation unit configured to provide a left speed instruction for adjusting a rotational speed of the left drive wheel and a right speed instruction for adjusting a rotational speed of the right drive wheel; and
a drive control unit configured to control driving of the left driving section and the right driving section based on the left speed instruction and the right speed instruction, with using a first control method and a second control method which are provided with different control properties from each other;
wherein the drive control unit includes a single mode employing either one of the first control method and the second control method and a composite mode employing the first control mode and the second control mode in time-differentiated combination; and
wherein in the composite mode, based on a difference between the left speed instruction and the right speed instruction, a combination ratio between the first control method and the second control method is determined.

2. The traveling vehicle of claim 1, wherein the first control method is PI control or PID control, and the second control method is P control.

3. The traveling vehicle of claim 2, wherein:
if the left speed instruction is greater than the right speed instruction, a ratio of the P control in the drive control of the right driving section is set greater than the ratio of the P control in the drive control of the left driving section; and
if the right speed instruction is greater than the left speed instruction, the ratio of the P control in the drive control of the left driving section is set greater than the ratio of the P control in the drive control of the right driving section.

4. The traveling vehicle of claim 2, wherein the left speed instruction and the right speed instruction are compared with each other, and the single mode using the PI control alone is employed for the drive control based on the greater speed instruction, whereas the composite speed control is employed for the drive control based on the smaller speed instruction.

5. The traveling vehicle of claim 1, wherein:
the left speed instruction and the right speed instruction respectively include a forward speed instruction and a reverse speed instruction; and
if the forward speed instruction and the reverse speed instruction are provided to the left driving section and the right driving section, the composite mode is employed for the drive control based on the reverse speed instruction.

6. The traveling vehicle of claim 1, wherein in the composite mode, the combination ratio is determined based on a duty ratio within a predetermined control cycle, and the duty ratio is fixed or variable.

\* \* \* \* \*